United States Patent [19]

Shrum et al.

[11] Patent Number: 5,335,874
[45] Date of Patent: Aug. 9, 1994

[54] CONNECTORIZED OPTICAL FIBER CABLE REEL

[75] Inventors: Ralph E. Shrum, Newton, N.C.; David C. Hall, Keller, Tex.

[73] Assignee: Siecor Corporation, Hickory, N.C.

[21] Appl. No.: 979,012

[22] Filed: Nov. 20, 1992

[51] Int. Cl.⁵ .................. B65H 75/14; B65H 75/18
[52] U.S. Cl. ................ 242/118.4; 242/608.4; 242/118.41; 242/118.6; 242/159
[58] Field of Search .......... 242/118.41, 118, 118.4, 242/118.6, 118.61, 118.62, 118.7, 118.8, 115, 116, 117, 77, 77.3, 77.4, 159, 166, 167, 172

[56] References Cited

U.S. PATENT DOCUMENTS

| | | | |
|---|---|---|---|
| 2,099,102 | 11/1937 | Brown et al. | 242/77.4 |
| 3,240,444 | 3/1966 | Gentile | 242/77.4 |
| 3,940,086 | 2/1976 | Stoquelet | 242/118.6 |
| 4,880,182 | 11/1989 | Gelfman | 242/117 |
| 4,901,939 | 2/1990 | Obst et al. | 242/118.4 |

FOREIGN PATENT DOCUMENTS 954245 of 1964 United Kingdom ............ 242/118.4

OTHER PUBLICATIONS

Porta Systems Corp. publication PRTA 201-139-410 Issue 1, Jul. 1991, pp. 1-3.

*Primary Examiner*—Stanley N. Gilreath
*Attorney, Agent, or Firm*—J. David Abernethy

[57] ABSTRACT

Disclosed is an improved cable reel having a dismountable end flange mounted on the same side of the hub as a fixed annular flange. The reel can be rolled on the annular flange when the dismountable flange is removed.

7 Claims, 2 Drawing Sheets

CONNECTORIZED OPTICAL FIBER CABLE REEL

BACKGROUND OF THE INVENTION

The field of the invention is cable reels.

Reels have long been the primary means of shipping cables of various types. A difficulty exists regarding protecting connectors at the end of the cable, fiber optic cable in particular. This problem is due to large, heavy connectors at the end of tiny, relatively fragile optical fibers. The typical prior art method is to spool the cable on a large enough reel to accommodate both cable and connectors. This solution creates wasted space, however, on larger and heavier than desired reels. Another solution is to construct the reel with a butterfly flange which splits the hub area into two areas, one for cable and one for the connectorized cable end. This method is an expensive solution which accommodates one connectorized end only.

Many jobs now require kits; in addition to a cable with connectors, the kit includes any hardware that is necessary for installation on the job site all shipped together in one package. Shipping installation hardware adds another element of complexity to the protection and packaging of assemblies. One solution is to use a corrugated carton configured to accommodate all things needed on site: the cable, connectors, and the hardware. These boxes tend to take up extra space and lack the ease of handling of cable reels which can be rolled.

Several reel designs have been used in the past to allow for multiple hubs on one reel axis for storage of additional loops of cable. Hill, in British patent specification 954,245, disclosed a cable reel having multiple concentric hubs for the storage of electric cables having terminal ends or wire ropes having sockets at their ends. Another reel was disclosed in U.S. Pat. No. 4,901,939, having a common inventor with this application; this patent discloses a fiber optic cable on a reel having multiple hubs. However, the multiple hubs in the prior art reel determined annular spaces between successive hubs for disposal of additional loops of cable. These annular spaces are not sufficient for the storage of installation hardware or the larger hardware items attached to modern assemblies such as boxes to be installed beneath computer room floors. Stoquelet, in U.S. Pat. No. 3,940,086, disclosed a cable reel having dismountable end flanges and a central tube of co-equal diameter with the flange central aperture on which to support a reel supporting spindle.

BRIEF SUMMARY OF THE INVENTION

The improved reel according to the current invention combines the convenience of a reel which can be spooled on a rotating shaft with the convenience of storing items within the reel hub. The improved reel comprises a tubular hub which has a hollow interior therein and a perforated end. A cable is wound on the hub, and hardware stored in the hub interior is attached to an end of the cable. This hardware may include connectors or small cable or fiber distribution boxes to be located beneath computer floors. A dismountable end flange having a central aperture therein for receiving a rotating shaft is mounted over the hub perforated end to prevent removal of the hardware stored in the hub interior when the end flange is mounted, but allows removal of said hardware from the hub interior when the end flange is dismounted. The hub may further be provided with means for securing items stored in the hub interior from motion with respect to the hub; such may include ordinary packing material or rods immediately adjacent the interior wall of the hub to which items may be fastened. The hub should have no axial tube extending the width of the hub of co-equal internal diameter with the end flange central aperture; such would detract from the storage capacity of the hub.

The preferred embodiment as shown in the drawings provides that the hub have a first end flange having a central aperture therein for receiving a rotatable shaft. This flange is secured to a first end of the hub. A second end flange is secured to the second or opposite end of said hub; this second end flange has a central aperture therein larger than the central aperture of the first end flange. Items stored in the hub interior may be passed through the central aperture of the second end flange. A third end flange having a central aperture therein for receiving a rotatable shaft is mounted to the second end flange. The third end flange may be dismounted in order to allow removal of items from the hub interior. The first and second end flanges should be substantially annular in shape and have outer rims equidistant from the hub to provide the reel with the convenience of the capacity to be rolled. A channel in the second end flange may be provided to allow a cable to extend from the hub outer surface to the hub interior. This allows connectors or other hardware items to be attached to an end of the cable and stored in the hub interior. Other items, such as tool kits for installation of the cable, may also be stored in the hub interior.

BRIEF DESCRIPTION OF THE DRAWINGS

The preferred embodiment is described with the aid of the drawings, in which.

DETAILED DESCRIPTION OF THE PREFERRED EMBODIMENT

Figure 1:
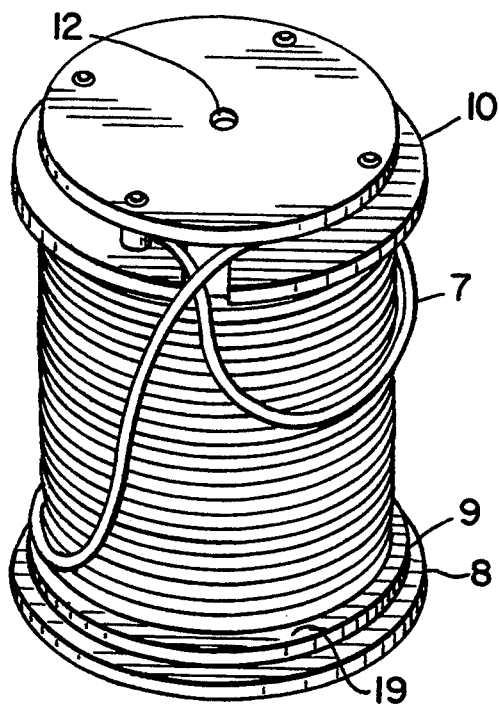
FIG. 1 is an inclined view of the improved reel.

The improved reel as shown in the drawings has a cable 7 wound on hollow tubular hub 18. On the first end of hub 18, which is shown as the bottom of hub 18 in the drawings, is attached first annular end flange 19 having a central aperture 20 therein for receiving a rotating shaft. The reel rests on a pallet 8. Secured to the second end of hub 18, which is shown as the top of hub 18 in the drawings, is second annular end flange 10 having a central aperture delimited by inner surface 24 of second end flange 10 which is larger than central aperture 20. A third end flange 11 is secured to second end flange 10 in such a way that third end flange 11 may be mounted to or dismounted from second end flange 10.

Figure 3:
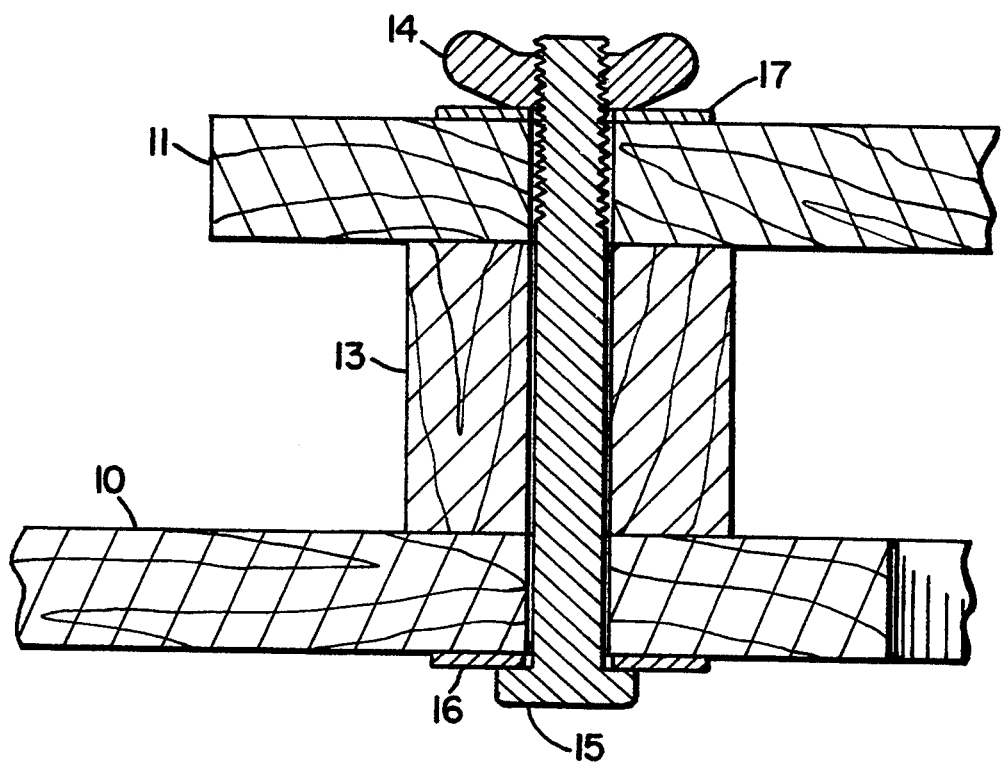

The preferred means for securing the second and third end flanges together are best seen with reference to FIG. 3. A metal bolt 15, secured by wing nut 14, is passed through holes drilled in flanges 10 and 11. Washers 16, 17 are also used. A block 13 separates flanges 10 and 11 to provide for ease of removal and also to provide extra room for cable 7 to pass through to the interior of hub 18. End flanges 10 and 11 and block 13 are shown as wooden but may also be any other strong, lightweight material such as plastic. Third end flange 11 also has a central aperture 12 therein of equal diameter with central aperture 20 of first end flange 19 so that the reel may be mounted on a rotatable shaft for spooling.

The outer rim 9 of first end flange 19 and outer rim 70 of second end flange 10 should be equidistant from hub 18 in order that the improved reel may be conveniently rolled.

Figure 2:
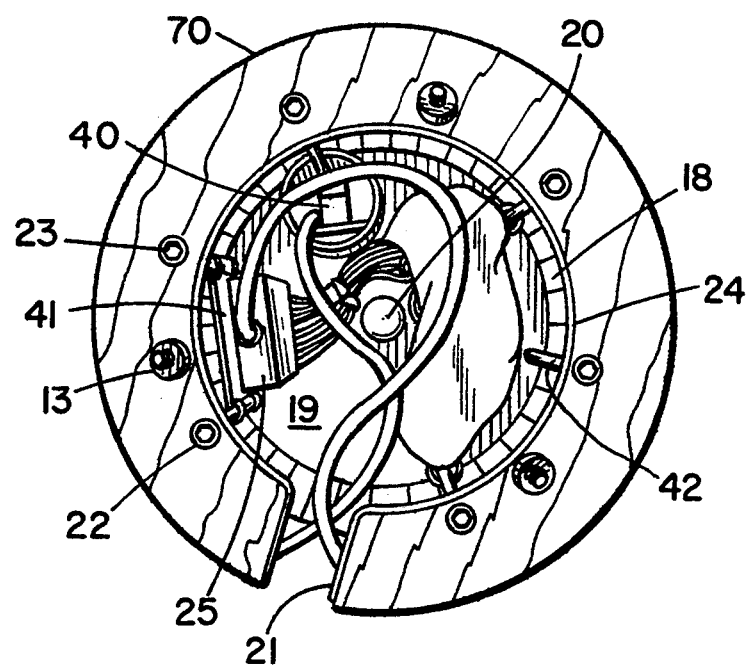
FIG. 2 is a plan view of the improved reel with the removable end flange removed; and, FIG. 3 is an exploded sectional elevation view of the preferred means for attaching the dismountable end flange to the second end flange having a larger central aperture.

Second end flange 10 has a channel 21 therein whereby cable 7 may be conveniently passed to the interior of hub 18. As shown in FIG. 2, cable 7 has connected to one end thereof a splicing hardware container 25, to which various jumpers are connected. Also contained within the interior of hub 18 is an installation kit 40 containing items to be used for installation of cable 7 and attachments. Third end flange 11 prevents removal of items stored in the interior of hub 18 until third end flange 11 is removed.

For stability and ease of packing, rods 42, 22, 23, and others are passed through the interior of hub 18 closely adjacent to the interior surface of hub 18 and fastened at end flanges 10, 19. Items may then be attached to these rods by means of a fastening board 41 and tie wraps, clips, cylinders, or the like. These rods also help remove the need to have any axial tube extending the width of the hub 18 of coequal internal diameter with central apertures 20, 12. Such an axial tube would limit the ability of hub 18 to act as a storage compartment after spooling as contemplated in this invention.

What is claimed is:

1. An improved cable reel, comprising
   a tubular hub having a hollow interior therein;
   a first end flange secured to a first end of said hub, said first end flange having a central aperture therein for receiving a rotating shaft;
   a second end flange secured to a second end of said hub, said second end flange having a central aperture therein larger than the central aperture of the first end flange;
   a third end flange having a central aperture therein for receiving a rotatable shaft; and,
   securing means for mounting the third end flange to, and dismounting the third end flange from, the second end flange.

2. A reel as recited in claim 1 wherein the first and second end flanges are substantially annular in shape and have outer rims equidistant from the hub.

3. A reel as recited in claim 1 having no axial tube extending the width of said hub of coequal internal diameter with the third end flange central aperture.

4. A reel as recited in claim 1 wherein the second end flange includes a channel for receiving a cable extending from an outer surface of the hub to the hub interior.

5. A reel as recited in claim 4 further comprising a cable wound on the reel having hardware attached to an end of said cable, said hardware stored in the hub interior.

6. A reel as recited in claim 5, further comprising items to be used for installation of said cable, said items stored within the hub interior.

7. An improved reel and cable assembly, comprising:
   a tubular hub having a hollow interior therein and at least one open end;
   an end flange mounted on said hub at said at least one open end and having a central aperture providing access to the hub interior;
   a dismountable end flange secured to said first mentioned end flange over the at least one open end of said hub and having a central aperture therein for receiving a rotatable shaft; and,
   a cable wound on said hub and having hardware attached to an end of the cable passing through the central aperture of the first mentioned end flange and into said at least one open end of said hub.

* * * * *